No. 849,792. PATENTED APR. 9, 1907.
J. JOWITT.
VISE.
APPLICATION FILED DEC. 26, 1906.
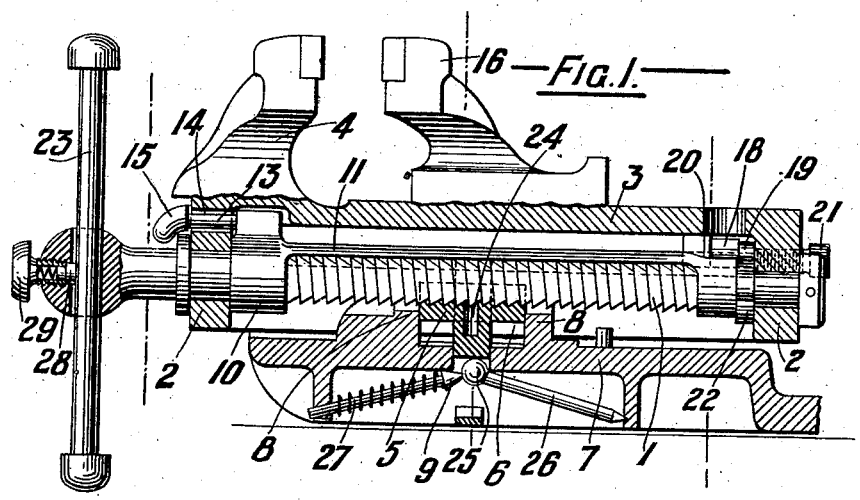
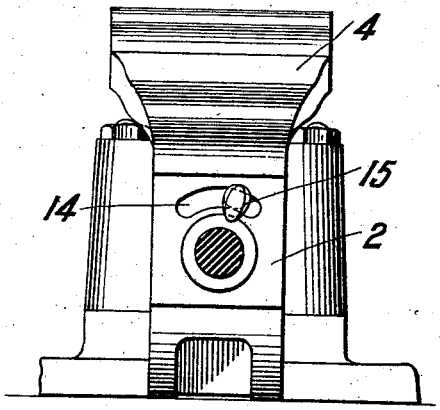
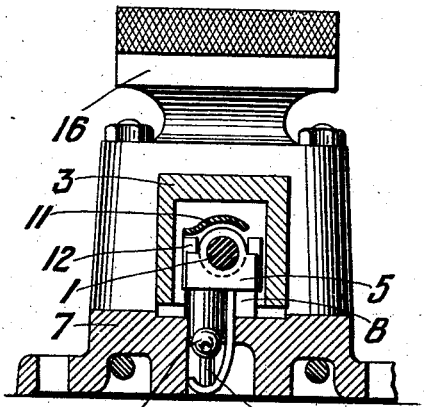
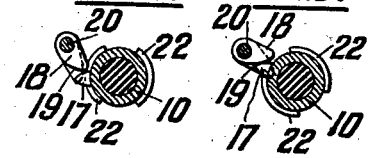
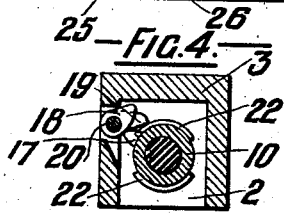
Witnesses
Chas H. Smith
A. H. Serrell
Inventor
Josiah Jowitt.
per Harold Serrell
his Atty

UNITED STATES PATENT OFFICE.

JOSIAH JOWITT, OF LEEDS, ENGLAND.

VISE.

No. 849,792.  Specification of Letters Patent.  Patented April 9, 1907.

Application filed December 26, 1906. Serial No. 349,468.

*To all whom it may concern:*

Be it known that I, JOSIAH JOWITT, a subject of the King of Great Britain, residing at Leeds, Yorkshire, England, have invented certain new and useful Improvements in Vises, of which the following is a specification.

Parallel vises are known in which the vise-screw is carried in the movable part and engages a half or divided nut movably carried in the stationary part. In such vises the nut has been forced upward to engage the screw by a spring and a lever has been fitted in the stationary part, beneath the screw, by which the nut could be pressed out of engagement with the screw, so that the movable part could be freely slid in and out, and it is to this known class of vises to which my present invention refers. In this known type of vises it has also been proposed to clamp a sleeve by friction upon the stem of the vise-screw and to cause an arm from such sleeve to extend parallel with and nearly the whole length of the screw, and this arm has been in sliding connection with the half-nut, so that when the vise-screw is turned in one direction the half-nut, owing to the friction of the sleeve on the screw, would be lifted up into engagement with the screw, while when the vise-screw is turned in a counter-clockwise direction the nut would be thrown out of engagement and the movable part of the vise could be slid freely in and out. In this latter known construction, however, the engagement of the nut with the vise-screw was dependent entirely upon the nut being lifted by the friction of the lifting-arm collar upon the vise-screw, and, moreover, at all times when the vise-screw was turned in a counter-clockwise direction the nut would be thrown out of engagement with the vise-screw.

Now the present invention refers to vises of the latter class, the object being to provide means by which the sleeve, which is not, according to my invention, frictionally connected with the vise-screw, is rendered capable of being partly rotated relatively to the vise-screw by means of a member proceeding from the sleeve to the exterior of the sliding member, while at the same time the half-nut is forced upward toward engagement with the screw by means of a spring, so that the moving part of the vise can be slid in or out freely only so long as the operating-stud of the sleeve is held by the attendant; but immediately the stud is released the nut flies back and engages the vise-screw and replaces the sleeve in its original position.

At the same time the further object of the invention is to provide devices in connection with the vise-screw and the said sleeve which can be so set that when the screw is moved in a counter-clockwise direction through a short distance the sleeve will be acted upon and the nut thrown out of engagement; but upon again turning the screw in a clockwise direction to close the jaws the screw will automatically engage the nut and allow the jaw to be closed by the action of the screw.

The invention will be described with reference to the example of construction shown in the accompanying drawings, whereon—

Figure 1 is a sectional side elevation, and Fig. 2 a sectional front elevation. Fig. 3 is a vertical cross-section through the stationary base and the slide of the moving jaw. Fig. 4 is a vertical cross-section showing the devices hereafter described set in a position to allow the vise to be opened and closed by the screw as in ordinary vises, while Figs. 5 and 6 show the said devices in two positions which the latter assume when the operating-screw is thrown out of gear by a backward motion of the screw-handle and thrown into gear by a forward motion of the same.

The usual operating-screw 1 is mounted in bearings 2 in the slide 3 of the moving jaw 4, and the half-nut 5 is located in a recess 6 in the bed 7, so as to be capable of vertical motion between forward and rearward buttress-blocks 8. The nut is forced upward into engagement with the screw by a spring device 9, a particular construction of which spring device is hereafter described.

The above-mentioned parts of the mechanism are broadly known. Now according to my present invention I cause the screw to loosely pass through a tubular sleeve, a segmental portion of which is cut away, so that the sleeve assumes the form of two collars 10, loosely surrounding the screw, one near either end, connected by a straight part or bar 11. I then provide a stud or arm 13, extending from the forward end of the sleeve, passing through a slot 14, Fig. 2, in the front face of the movable jaw 4, and carrying an exterior thumb-piece 15, so that when the operator presses the thumb-piece the bar 11 bears upon an upward projection 12 of the screw-nut 5 and forces the nut against the action of its spring from the screw, so that the slide 3, together with the screw, can be freely slid in or out toward or away from the fixed jaw 16, and when the thumb-piece 15 is released the sleeve assumes its normal angular position by reason of the rise of the nut 5 under its spring-pressure, the latter nut then engaging the screw.

In order to permit the nut to be disengaged to free the jaw 4 by giving a counter-clockwise motion to the screw and to allow of the nut again automatically engaging upon a clockwise motion of the screw, the rear end collar of the sleeve 10 (which I term the "sleeve-pinion") is formed with a tooth 17, Fig. 4, and pivoted in a slot cut out of the slide 3 is a double-toothed member having teeth 18 19 formed in one piece and capable of turning about a pivot-pin 20 in the said slide, the pivot-pin 20 being formed with a milled head 21, being screw-threaded into the slide and shouldered to freely pass through the axis of the teeth 18 19, so that when the pivot-pin 20 is not screwed up tightly the teeth can freely rock on said pivot, while when the pivot is screwed up by the milled head 21 the teeth are retained in position by friction by the shoulder of the pivot-pin 20.

Fixed on the rear end of the operating-screw 1 is a segmental pinion 22, Figs. 1, 4, 5, and 6, having preferably two teeth, the said pinion revolving with the screw.

With this construction when it is required that the vise should operate in the ordinary manner—that is, that the sliding jaw 4 is to be made to work backward and forward by turning the operating-screw—the handle of the screw is turned in a clockwise direction until the tooth 19, Fig. 4, is raised by one of the segment-teeth of the segmental pinion 22, and then the milled head 21 is turned, clamping the teeth 19 18 in the position shown at Fig. 4, and therefore out of further operation. In this position the moving jaw can be operated by the ordinary handle 23 through the medium of the screw 1, as with vises of ordinary construction.

In order to throw the automatic device into action, the screw-pivot 20 is loosened by means of the milled head 21, and then by slightly rotating the screw 1 by means of the handle 23 in a counter-clockwise direction the tooth 19 falls into the next space between the segment-teeth of the segment-pinion 22 and the teeth 18 19 are rocked about their axis 20 into the position shown at Fig. 5, from which it will be observed that the tooth 18 has acted upon the tooth 17 on the rear sleeve-collar 10 and holds the sleeve in such a position that the part 11 of the sleeve is pressing upon the nut 5 and holding the latter free of the screw. Then the slide 3 can be slid freely inward or outward; but immediately the screw is turned by the handle 23 in a clockwise direction the tooth 19 again enters a space between the segmental teeth of the pinion 22 and the teeth 18 19 are turned in a counter-clockwise direction, and the sleeve is released and permits the rise of the nut 5 into engagement with the screw, so that upon turning the handle and the operating-screw in the ordinary way the screw will operate to close the moving jaw.

It will be apparent from the foregoing description that so long as the parts are maintained in the position shown in Fig. 5 that the slidable member and its jaw will be free to be moved within the slideway in the fixed member, and that if a further counter-clockwise movement be given to the screw 1 sufficient to cause the tooth 19 to enter the second aperture between the segment-teeth of the segment-pinion 22 that the nut 5 will be raised through the spring device by the release of the tooth 18, and that to cause the slidable member to be again freely movable in the fixed member a further counter-clockwise movement must be given the screw 1 to cause the parts to again assume the positions shown in Fig. 5, whereas when this relationship of parts is attained and a clockwise movement given to the screw 1 the tooth 19 enters the first aperture between the segment-teeth of the segment-pinion 22, releasing the tooth 18 and bar 11, thereby causing the nut 5 to engage the screw 1, which relationship, as was hereinbefore described, is maintained so long as the screw is turned clockwise.

In constructing the vise I preferably form the nut with a central recess or boring 24, in which any lubricant can be inserted, the recess forming a kind of lubricant-reservoir, and the spring acting to force the nut upward consists in the construction shown of a spherical-shaped part 25, carried at the end of a centered rod 26, the spherical part 25 being forced and held upwardly by a plunger 27, acted upon by a spiral spring. Beyond this, since it is convenient when rapidly operating the vise that the handle 23 should remain in about the position shown at Fig. 1 I provide a plunger 28 in a boring in the end of the screw-spindle, so that it contacts with the handle, being forced thereto by a helical spring, the tension of which is controlled by a milled headed screw 29.

What I claim as my invention, and desire to secure by Letters Patent, is—

1. In a parallel vise; the combination with a stationary member having a horizontal slideway formed therein and a recess in the base of the slideway, a sliding member located in the slideway of the stationary member, a revoluble screw, bearings in the sliding member to carry the screw, and a handle on the exterior end of the screw for operating the same, a half-nut located in the recess of the slideway, and a spring to normally force the half-nut upward into engagement with the screw; of a sleeve composed of two collars connected by a bar through which collars the screw loosely extends, an operating-arm extending from the sleeve to the exterior of the sliding member for manually rocking said sleeve to cause its bar to press the half-nut out of engagement with the screw substantially as set forth.

2. In a parallel vise; the combination with a stationary member having a horizontal slideway formed therein and a recess in the base of the slideway a sliding member located in the slideway of the stationary member having a central longitudinal recess on its under surface in the direction of said slideway, a revoluble screw located in said recess, bearings in the forward and rearward walls of said sliding member to carry said screw, said sliding member having a segmental slot through its forward wall concentric with the axis of said screw, and a handle on the exterior end of said screw for operating the same, a half-nut located in the recess of the slideway, and a spring to normally force the half-nut upward into engagement with the screw; of a sleeve composed of two collars connected by a bar through which collars the screw loosely extends and an operating-arm extending from the forward collar of the sleeve through the segmental slot of the sliding member for manually rocking the said sleeve about the screw-axis to cause the sleeve-bar to act on the half-nut to temporarily throw the latter out of engagement with the screw substantially as set forth.

3. In a parallel vise; the combination with a stationary member having a horizontal slideway formed therein and a recess in the base of the slideway, a sliding member located in the slideway of the stationary member and having a central longitudinal recess on its under surface in the direction of said slideway, a revoluble screw located in said recess, bearings in the forward and rearward walls of said sliding member to carry said screw, said sliding member having a segmental slot through its forward wall concentric with axis of said screw, and a handle on the exterior end of said screw for operating the same, a half-nut located in the recess of the slideway, and a spring to normally force the half-nut upward into engagement with the screw; of a sleeve composed of two collars connected by a bar through which collars the screw loosely extends, an operating-arm extending from the forward collar of the sleeve through the segmental slot of the sliding member to the exterior for manually rocking said sleeve, an upstanding projection extending from one side of the half-nut against which the bar of the sleeve contacts when the latter is rocked to throw the half-nut out of engagement, substantially as set forth.

4. In a parallel vise; the combination with a stationary member having a horizontal slideway formed therein and a recess in the base of the slideway, a sliding member located in the slideway of the stationary member, a revoluble screw, bearings in the sliding member to carry the screw, a handle on the exterior end of the screw, a half-nut in the recess of the slideway and a spring to normally force said half-nut upward to engage with the screw, a sleeve composed of two collars connected by a bar through which collars the screw loosely passes, and an operating-arm extending from the forward collar of the sleeve to the exterior of the sliding member for rocking said sleeve to cause the bar to act upon the half-nut; of a double-toothed member freely pivoted on the sliding member of the vise, a radial tooth upon the rearward collar of the sleeve with which tooth one tooth of the pivoted member can coact, a pinion fixed on the rear end of the screw and having two segmental teeth with which the other tooth of the freely-pivoted member can coact, and means for holding the pivoted double-toothed member out of action when desired substantially as set forth.

5. In a parallel vise; the combination with a stationary member having a horizontal slideway formed therein and a recess in the base of the slideway, a sliding member located in the slideway of the stationary member, a revoluble screw, bearings in the sliding member to carry the screw, and a handle on the exterior end of the screw for operating the same, a half-nut located in the recess of the slideway, a spring to normally force the half-nut upward into engagement with the screw, a sleeve composed of two collars connected by a bar, through which collars the screw loosely extends, and means for manually rocking the sleeve about the axis of the screw to cause the sleeve-bar to act on the screw to cause the sleeve-bar to act on the half-nut to temporarily throw the latter out of engagement with the screw; of a pinion having segmental teeth fixed on the rear end of the screw, and a tooth on the rear end of the sleeve, a pivot in the sliding member, and a member freely mounted on the pivot, a first tooth on said pivoted member calculated to be engaged by the pinion-teeth of the screw upon a counter-clockwise movement of said screw to rock the pivoted member, and a second tooth of the pivoted member to act on the sleeve-tooth to rock said sleeve and throw the half-nut out of engagement, and means for holding the pivoted double-toothed member out of action when desired substantially as set forth.

In witness whereof I have hereunto set my hand in the presence of two witnesses.

JOSIAH JOWITT.

Witnesses:
GRIFFITH BREWER,
JOHN JOWETT.